(12) United States Patent
Richard et al.

(10) Patent No.: US 6,804,960 B2
(45) Date of Patent: Oct. 19, 2004

(54) FUSE DEVICE FOR PNEUMATIC BRAKE BOOSTER

(75) Inventors: Philippe Richard, Chelles (FR); Olivier Castello, Bondy (FR)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/429,355

(22) Filed: May 5, 2003

(65) Prior Publication Data
US 2003/0209135 A1 Nov. 13, 2003

(30) Foreign Application Priority Data
May 7, 2002 (FR) .............................. 02 05771

(51) Int. Cl.⁷ .............................................. B60T 17/18
(52) U.S. Cl. ........................................ 60/582; 91/369.2
(58) Field of Search ........................ 60/582; 91/369.2, 91/376 R; 92/140; 180/232, 274; 280/748

(56) References Cited
U.S. PATENT DOCUMENTS 5,176,063 A * 1/1993 Levrai et al. ............. 91/376 R
5,249,504 A * 10/1993 Gautier et al. ............ 91/376 R
5,476,032 A * 12/1995 Gautier et al. ............ 91/376 R
5,493,948 A * 2/1996 Gautier et al. ............ 91/369.2
6,752,038 B2 * 6/2004 Cordero ..................... 180/274

* cited by examiner

Primary Examiner—Edward K. Look
Assistant Examiner—Michael Leslie
(74) Attorney, Agent, or Firm—Leo H. McCormick, Jr.; Warren Comstock

(57) ABSTRACT

A fuse device for a pneumatic brake booster, characterized by a hollow cylindrical first part (21) with a first end (25) having an inside diameter (d1) and a bowl-shaped second part (24) with a circular bottom equipped on its central external part with a roughly cylindrical stud (29) of an outside diameter (d2) slightly greater, within the tolerances, than the inside diameter (d1) of the end of the hollow cylindrical first part (21). The outside diameter (d2), allowing the hollow cylindrical first part (21) to be secured to the bowl-shaped second part (24) by forcibly inserting the stud (29) into hollow end (25) of smaller diameter (d1). The bowl-shaped second part (24) having a circular external groove (30) whose purpose is to weaken the connection between the stud (29) and the bottom (26) of the bowl-shaped second part (24) when a pair of forces is applied to the fuse device to allow the hollow cylindrical first part to detach from the bowl-shaped second part.

4 Claims, 3 Drawing Sheets

FUSE DEVICE FOR PNEUMATIC BRAKE BOOSTER

The present invention relates to a fuse for the push rod of a pneumatic brake booster, to its method of assembly and to the pneumatic brake booster comprising such a fuse.

BACKGROUND OF THE INVENTION

Pneumatic braking installations comprising a pneumatic brake booster are known. Such a pneumatic booster is described for example in document FR-A-2 744 085 in the name of the applicant company. It comprises a front shell and a rear shell together forming a rigid casing. A moving partition sealingly divides the inside of this rigid casing and therein delimits a front chamber and a rear chamber. At rest, the front chamber is connected to a source of depression which delivers a pressure Pd that is low by comparison with atmospheric pressure Pa. At rest, the rear chamber is in communication with the front chamber. A pneumatic piston moves with the moving partition. The booster is controlled by a control rod that can move between a rest position and an actuating position. When a force is exerted on the control rod by the brake pedal, this force, higher than the return force of a spring, causes the communication between the front and rear chambers to be closed, causes the rear chamber to communicate with an environment at atmospheric pressure, and pushes the moving partition forward and generates a boost force used to actuate a master cylinder.

The booster also comprises a reaction disk arranged in front of a plunger controlled by the control rod and housed in a housing borne by one end of a push rod transmitting the boost force to a piston of a master cylinder. The reaction disk is made of substantially incompressible materials combining a control force applied by the plunger, a boost force applied by the pneumatic piston and a reaction force from the master cylinder and transmitted via the push rod, and allowing the driver to feel, at the brake pedal, the reaction of the brake circuit and thus adapt his braking.

In these pneumatic installations fitted to motor vehicles, the control rod actuated by the brake pedal is connected to the master cylinder. When the motor vehicle is in a frontal impact with an obstacle, it has been found that the engine and battery assembly located in the engine compartment is pushed against the bulk head that separates the engine compartment and the cabin, and the thrust experienced by the engine assembly is passed on to the pneumatic brake booster, and therefore to the master cylinder and to the pneumatic brake booster as a whole. As there is a connection between the driver's foot resting on the brake pedal and the end of the master cylinder, the rearward thrust due to the impact is passed on to the driver's foot, which suffers an impact.

SUMMARY OF THE INVENTION

The object of the invention is therefore to eliminate the impact suffered by the driver's foot when the motor vehicle is in collision with an obstacle.

It is known that, in order to eliminate this impact, it is necessary, in order to prevent the return of the pedal, to cut part of the transmission between the brake pedal connected to the control rod of the pneumatic brake booster and the master cylinder. For this, a fuse device has been provided in the pneumatic brake booster which eliminates the kinematic connection between the brake pedal and the master cylinder. This fuse device consists of a ring which holds the end face of the push rod of the piston and the housing of the reaction disk. This ring is held by compression on the push rod and the housing or by crimping to the periphery of the push rod and of one end of the housing. It is therefore external to the primary piston rod. One disadvantage with such a system is therefore its axial bulk. If there is a sufficient impact, the ring deforms under the action of sufficient torque and frees the two components.

Another object of the invention is therefore to eliminate the radial bulk of the known fuse device.

Yet another object of the invention is to eliminate the ring and therefore to reduce the number of parts of which the pneumatic brake booster is made.

Another object is to reduce the cost of the pneumatic brake booster, this cost being reduced by eliminating a part and by simplifying the assembly.

To this end, the invention relates to a fuse device for a pneumatic brake booster, characterized in that it comprises a hollow cylindrical first part one end of which has an inside diameter d1 and a bowl-shaped second part with a circular bottom equipped on its central external part with a roughly cylindrical stud of an outside diameter d2 slightly greater, to within the tolerances, than the inside diameter d1 of said end of said hollow cylindrical first part, so as to allow said hollow cylindrical first part to be secured to said bowl-shaped second part by forcibly inserting said stud in said hollow end of smaller diameter d1, said bowl-shaped second part having a circular external groove whose purpose is to weaken the connection between said stud and said bottom of said bowl-shaped second part when a pair of forces is applied to said fuse device, so as to allow said hollow cylindrical first part to detach from said bowl-shaped second part.

The fuse device for a booster is also such that said hollow cylindrical first part is intended to form the push rod of the pneumatic brake booster.

Said bowl-shaped second part is intended to receive a reaction disk made of an elastomer placed at the bottom of the bowl, the reaction disk fitting the booster boost piston body.

Another subject of the invention is a pneumatic brake booster comprising: a rigid casing, a moving partition sealingly defining a front chamber and a rear chamber inside the casing, the front chamber in operation being subjected to a first pressure and the rear chamber being connected selectively to the front chamber or subjected to a second pressure higher than the first, a pneumatic piston moving with the moving partition, an axial control rod moving toward the piston as a function of an input force selectively exerted against the action of a return force and directed in an axial direction of actuation pointing toward the front chamber, the return force urging the control rod toward a return position and the input force urging the control rod 8 toward an actuating position which is dependent upon the input force, a three-way valve connecting the rear chamber to the front chamber when the control rod is in the rest position, and subjecting the rear chamber to the second pressure when it is actuated by movement of the control rod toward its actuated position, and a push rod, characterized in that it comprises a fuse device defined hereinabove.

BRIEF DESCRIPTION OF THE DRAWINGS

The invention will be better understood with the aid of the attached drawings in which:

FIG. 1 depicts a pneumatic brake booster device 1 according to the prior art.

Figure 1:
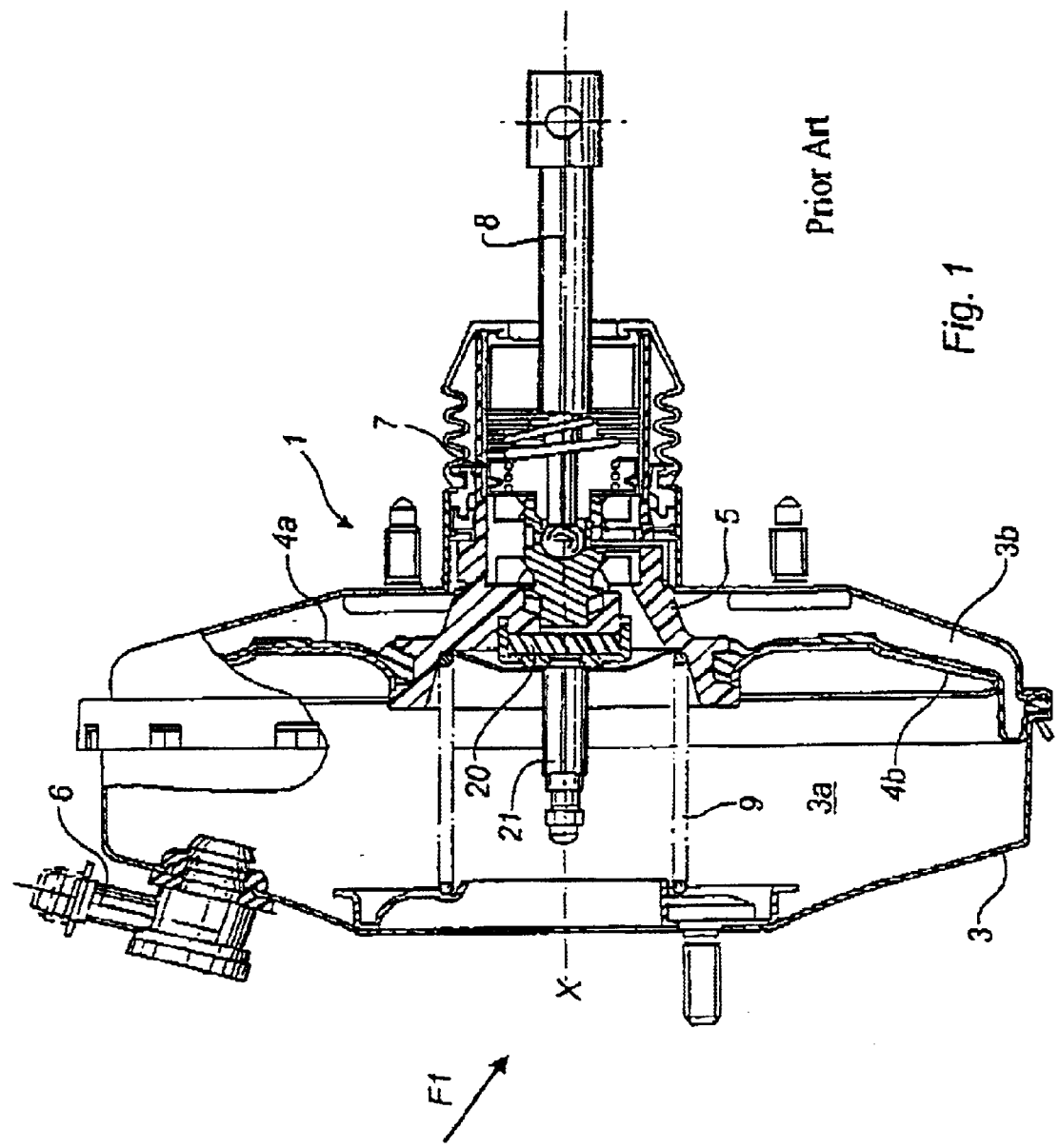
FIG. 1 is a view in section of a pneumatic brake booster device according to the prior art.

The booster 1 comprises a rigid casing 3 divided into two chambers 3a and 3b in a sealed fashion by a moving partition 4 consisting of a diaphragm 4a and a rigid skirt 4b able to drive a pneumatic piston 5 that can move inside the casing 3.

The chamber 3a, the front face of which is sealingly closed by a master cylinder (not depicted), is constantly connected to a source of depression through a coupling 6.

The pressure in the rear chamber 3b is controlled by a pneumatic 5 valve 7, operated by a control rod 8 which is connected to a brake pedal (not depicted).

When the control rod 8 is in the rest position, that is to say to the right, the pneumatic valve 7 establishes communication between the two chambers 3a and 3b of the booster.

The rear chamber 3b is then subjected to the same depression as the front chamber 3a, the piston 5 is pushed to the right, in the rest position, by a spring 9.

Actuation of the control rod 8, to the left, under the action of pressure exerted by the driver's foot has the effect first of all of moving the pneumatic valve 7 in such a way that it isolates the chambers 3a and 3b from one another then of moving the pneumatic valve 7 in such a way that it opens the rear chamber 3b to atmospheric pressure.

DETAILED DESCRIPTION OF THE INVENTION

The difference in pressure between the two chambers 3a and 3b then felt by the diaphragm 4a exerts a thrust on the moving partition 4 which tends to move to the left and allow it to drive the boost piston 5 which in turn moves, compressing the spring 9.

A reaction disk 20 made of substantially incompressible material is arranged in front of a plunger 25 borne by the control rod in a housing 26 secured to a push rod actuating a piston of the master cylinder (not depicted).

The braking force exerted on the control rod 8 and the brake boosting force resulting from the thrust of the moving partition 4 are then applied in the axial direction X–X+ of the control rod 8 to the reaction disk 20 in the direction of the master cylinder 2 and combine to constitute the force that actuates this master cylinder.

The actuating force is applied to the primary piston of the master cylinder and causes it to move to the left in the axial direction X–X+, which leads to a rise in pressure in the brake fluid present in the working chamber of the master cylinder, and to actuation of the brake connected thereto.

As the push rod 21 is fitted to the boost piston body 5 and as the latter is secured to the boosted brake assembly which itself is fixed in the engine compartment, if a force F is applied from left to right in FIG. 1, the push rod 21 is moved to the right, and likewise the control rod 8 is moved to the right, and this means that the driver's foot resting on the brake pedal secured to the control rod is also thrust strongly to the right. The purpose of the invention is therefore to avoid this mechanical connection between the driver's foot and the end of the master cylinder. It is also desirable for this goal to be achieved in a quick and inexpensive way.

Figure 2:
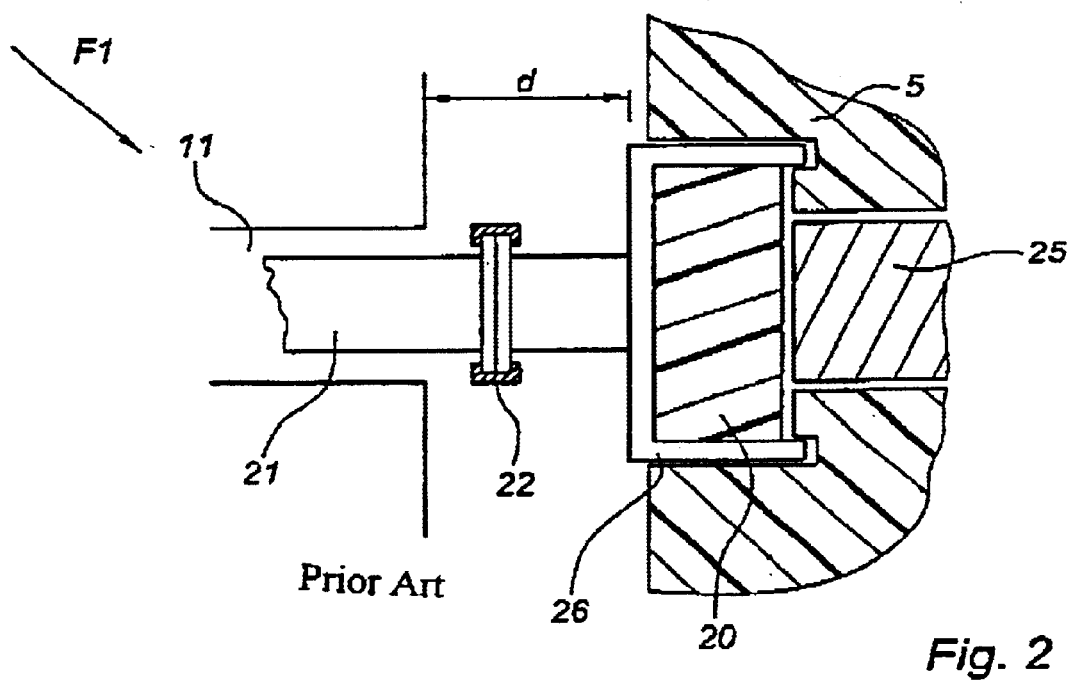
FIG. 2 is an enlarged schematic view of a connection between the rod of the primary piston and the part to which it is connected, this connection being via a fuse according to the prior art.

FIG. 2 schematically depicts the known means of breaking the connection between the master cylinder and the control rod in the event of a collision with an obstacle. The push rod 21 is connected by a ring 22 to the housing 26 of the reaction disk 20. This ring 22 is placed externally with respect to the push rod 21 and is fixed by a kind of crimping thereto. In an impact, the force in the direction of the arrow F1, the ring 22 deforms and the push rod 21 and the housing 26 of the reaction disk 20 are detached and the axial piston d between the piston body 11 and the boost piston body 23 is increased to compensate for the rearward movement of the push rod 21.

It will be understood that this device of the prior art has several disadvantages. A first disadvantage is that the ring is an attached part that has to be secured to the push rod 21 by means, for example, of a kind of crimping. This then introduces an additional part into the boosted brake device, and increases the cost of parts and the cost of assembly. Another disadvantage is that the ring is arranged on the outside of the push rod 21 and that it therefore increases the axial bulk.

Figure 3:
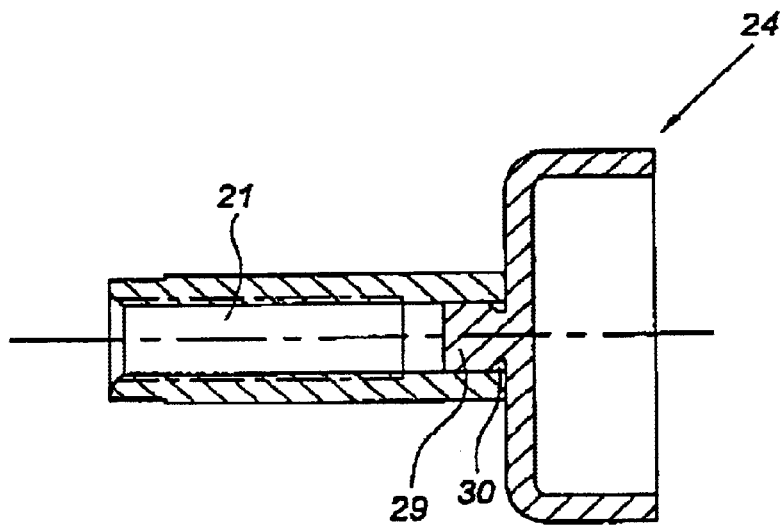
FIG. 3 is a view in cross section of the fuse according to the present invention.
Figure 4:
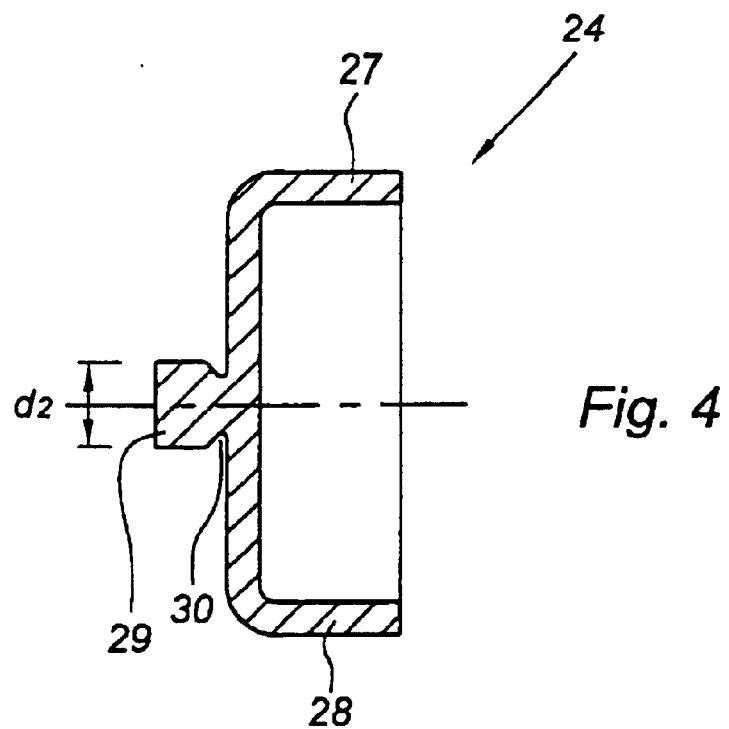
FIG. 4 is a view in cross section of the cup-shaped first part of the fuse of FIG. 3.
Figure 5:
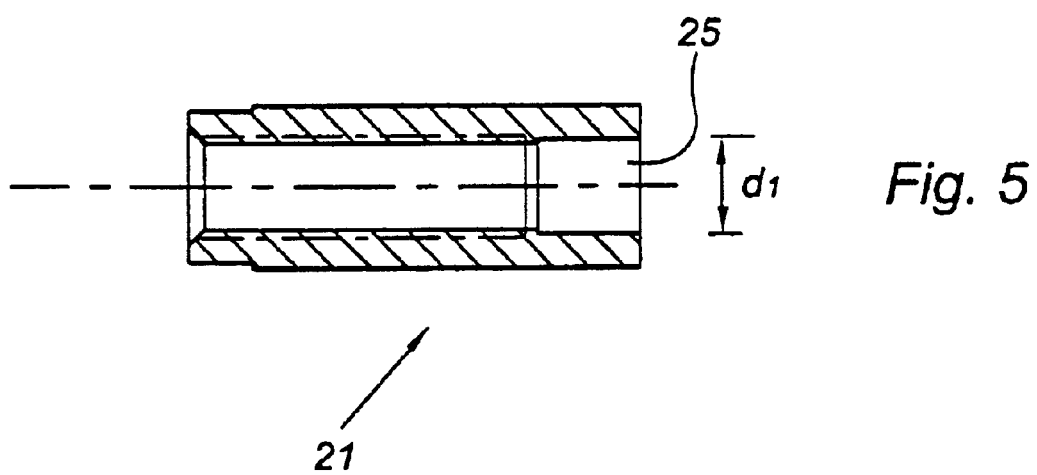
FIG. 5 is a view in cross section of the second part of the fuse of FIG. 3, complementing the cup-shaped first part.

FIGS. 3 to 5 depict the fuse device according to the invention. This device consists of a first part which is the push rod 21 which collaborates with a bowl-shaped second part 24.

The push rod 21 has a roughly tubular shape and at one of its ends has a bore 25 of inside diameter d1.

The second part 24 of the fuse device of the present invention has a bowl shape comprising a bottom 26 and side walls 27, 28 roughly perpendicular to the bottom 26. The bottom 26 is roughly circular and at its center has an external stud 29. The diameter d2 of the stud 29 is slightly greater than the inside diameter d1 of the bore 25 of the push rod 21. The bowl is secured to the push rod 21 by forcing the stud 29 of the bowl 24 into the bore 25 of the push rod 21. The mechanical connection between the push rod 21 and the bowl 24 is as a tight push fit between these two parts.

The stud 29 is connected to the bottom 26 of the bowl 24 by a circular groove 30. This groove 30 has the function of weakening the connection between the bottom 26 of the bowl and the stud 29. By applying a couple to the bowl 24, the groove 30 initiates rupture and when the applied couple is strong enough, the stud 29 comes away from the bottom 26. The bowl is then detached from the push rod 21.

The bowl 24 is mounted in the boosted brake device depicted in FIG. 1 and receives a reaction disk made of elastomer placed in the bottom of the bowl. The reaction disk fits the brake booster boost piston body.

According to the invention, there is therefore provided a fuse device which consists of just two parts rather than three as it did in the prior art. A saving on material and on assembly cost is therefore made. Furthermore, the connection is made by force fitting the two parts together and the outside diameter of the push rod is not increased. This therefore eliminates axial bulk, unlike the fuse device of the prior art.

We claim:

1. A fuse device for a pneumatic brake booster, characterized in that it comprises a hollow cylindrical first part (21) one end (25) of which has an inside diameter (d1) and a bowl-shaped second part (24) with a circular bottom equipped on its central external part with a roughly cylindrical stud (29) of an outside diameter (d2) slightly greater, within the tolerances, than the inside diameter (d1) of said end of said hollow cylindrical first part (21), so as to allow said hollow cylindrical first part (21) to be secured to said bowl-shaped second part (24) by forcibly inserting said stud (29) in said hollow end (25) of smaller diameter (d1), said bowl-shaped second part (24) having a circular external groove (30) whose purpose is to weaken the connection between said stud (29) and said bottom (26) of said bowl-shaped second part (24) when a pair of forces is applied to said fuse device, so as to allow said hollow cylindrical first part to detach from said bowl-shaped second part.

2. The fuse device for a booster according to claim 1, characterized in that said hollow cylindrical first part (21) is intended to form the push rod of the pneumatic brake booster.

3. The fuse device for a pneumatic brake booster according to claim 1, characterized in that said bowl-shaped second part (24) is intended to receive a reaction disk made of substantially incompressible materials placed at the bottom of the bowl, the reaction disk fitting the booster boost piston body.

4. A pneumatic brake booster comprising: a rigid casing (3), a moving partition sealingly defining a front chamber (3a) and a rear chamber (3b) inside the casing (3), the front chamber (3a) in operation being subjected to a first pressure and the rear chamber (3b) being connected selectively to the front chamber (3a) or subjected to a second pressure higher than the first, a pneumatic piston (5) moving with the moving partition, an axial control rod (8) moving toward the piston (5) as a function of an input force selectively exerted against the action of a return force and directed in an axial direction of actuation (X+) pointing toward the front chamber (3a), the return force urging the control rod (8) toward a return position and the input force urging the control rod (8) toward an actuating position which is dependent upon the input force, a three-way valve (7) connecting the rear chamber (3b) to the front chamber (3a) when the control rod (8) is in the rest position, and subjecting the rear chamber (3b) to the second pressure when it is actuated by movement of the control rod (8) toward its actuated position, and a push rod (21), characterized in that a fuse device having a hollow cylindrical first part (21) one end (25) of which has an inside diameter (d1) and a bowl-shaped second part (24) with a circular bottom equipped on its central external part with a roughly cylindrical stud (29) of an outside diameter (d2) slightly greater, within the tolerances, than the inside diameter (d1) of said end of said hollow cylindrical first part (21), so as to allow said hollow cylindrical first part (21) to be secured to said bowl-shaped second part (24) by forcibly inserting said stud (29) in said hollow end (25) of smaller diameter (d1) said bowl-shaped second part (24) having a circular external groove (30) whose purpose is to weaken the connection between said stud (29) and said bottom (26) of said bowl-shaped second part (24) when a pair of forces is applied to said fuse device, so as to allow said hollow cylindrical first part to detach from said bowl-shaped second part.

* * * * *